Figure 1:
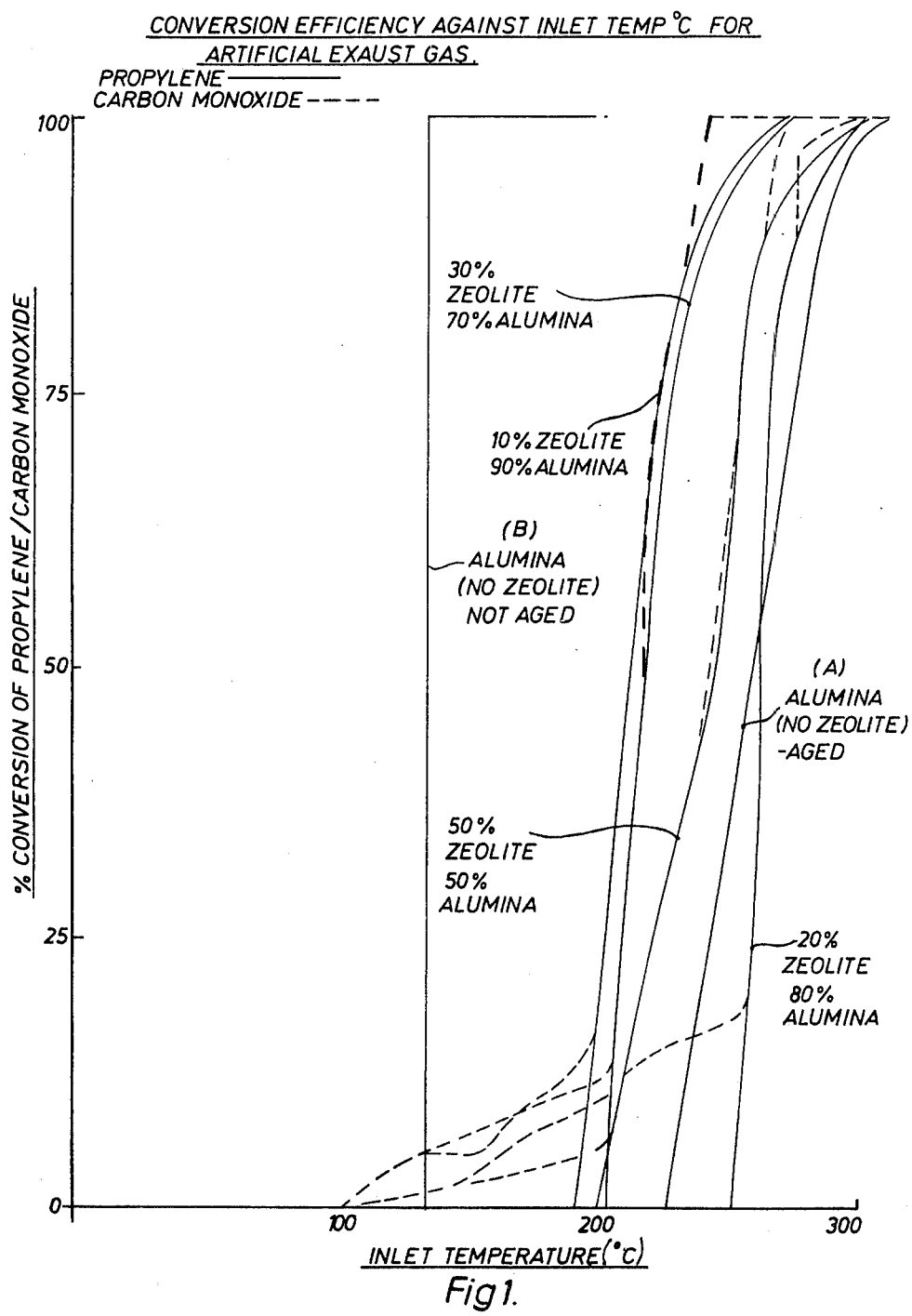

United States Patent [19]

Acres

[11] 4,025,606

[45] May 24, 1977

[54] CATALYSIS

[75] Inventor: Gary James Keith Acres, London, England

[73] Assignee: Johnson Matthey & Co., Limited, London, England

[22] Filed: July 3, 1974

[21] Appl. No.: 485,764

Related U.S. Application Data

[63] Continuation-in-part of Ser. No. 265,272, June 22, 1972, Pat. No. 3,839,225.

[30] Foreign Application Priority Data

June 25, 1971 United Kingdom ............. 29883/71
June 25, 1971 United Kingdom ............. 29884/71

[52] U.S. Cl. ............................... 423/245; 423/247
[51] Int. Cl.$^2$ ......................................... B01D 53/34
[58] Field of Search ......... 423/213.2, 213.5, 213.7, 423/245, 247

[56] References Cited

UNITED STATES PATENTS

| | | | |
|---|---|---|---|
| 3,226,340 | 12/1965 | Stephens et al. | 423/213.2 X |
| 3,257,163 | 6/1966 | Stiles | 423/213.2 |
| 3,554,929 | 1/1971 | Aarons et al. | 423/213.5 X |
| 3,755,534 | 8/1973 | Graham | 423/213.7 |
| 3,776,859 | 12/1973 | Simpson | 423/213.5 X |
| 3,806,582 | 4/1974 | Acres et al. | 423/239 X |

FOREIGN PATENTS OR APPLICATIONS 972,683  2/1960  United Kingdom

*Primary Examiner*—G. O. Peters
*Attorney, Agent, or Firm*—Cushman, Darby & Cushman

[57] ABSTRACT

This invention relates to processes for catalytically oxidizing organic compounds (for example methane, ethane, propylene and carbon monoxide) catalytically reducing oxides of nitrogen with a reducing fuel and the production of methane by the steam reforming of naphtha and naphtha distillates. In particular the invention relates to a process for the oxidation of carbon monoxide or a hydrocarbon present in an oxygen-containing gas stream to carbon dioxide and water.

In particular the invention relates to a process for the oxidation of carbon monoxide or a hydrocarbon present in an oxygen-containing gas stream to carbon dioxide and water, the process comprising passing the said gas stream at an elevated temperature through a supported catalyst consisting essentially of an inert material, an intermediate coating thereon containing at least one oxide selected from the group consisting of the oxides of scandium, yttrium and the lanthanides and a catalytically active surface coating on said intermediate coating of an alloy selected from the group consisting of (1) platinum/rhodium alloys wherein the rhodium constitutes 1–50 weight % of the total metal content of the alloy and the platinum the balance; and (2) platinum/rhodium/base metal alloys wherein the rhodium constitutes 1–50 weight % of the total metal content of the alloy, the base metal from 0.01 to 25 weight % of the said total metal content and the platinum the balance, the base metal being selected from the group consisting of aluminium, magnesium, bromium, molybdenum, tungsten, manganese, iron, cobalt, nickel, titanium, vanadium, thorium, uranium, copper, silver, zinc, cadmium, mercury, indium, thallium, bismuth, tin, lead, antimony, the lanthanides and the actinides.

23 Claims, 5 Drawing Figures

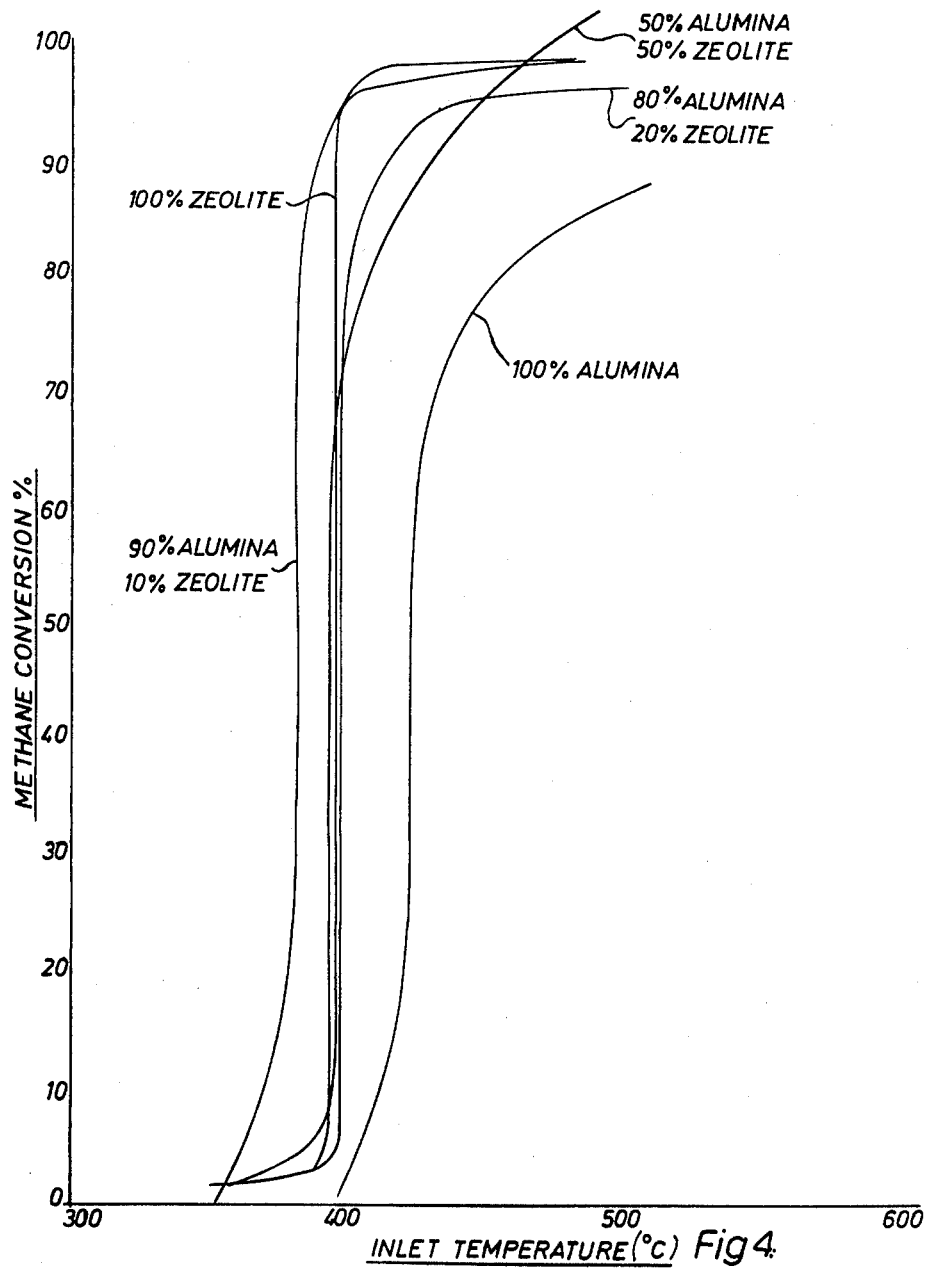

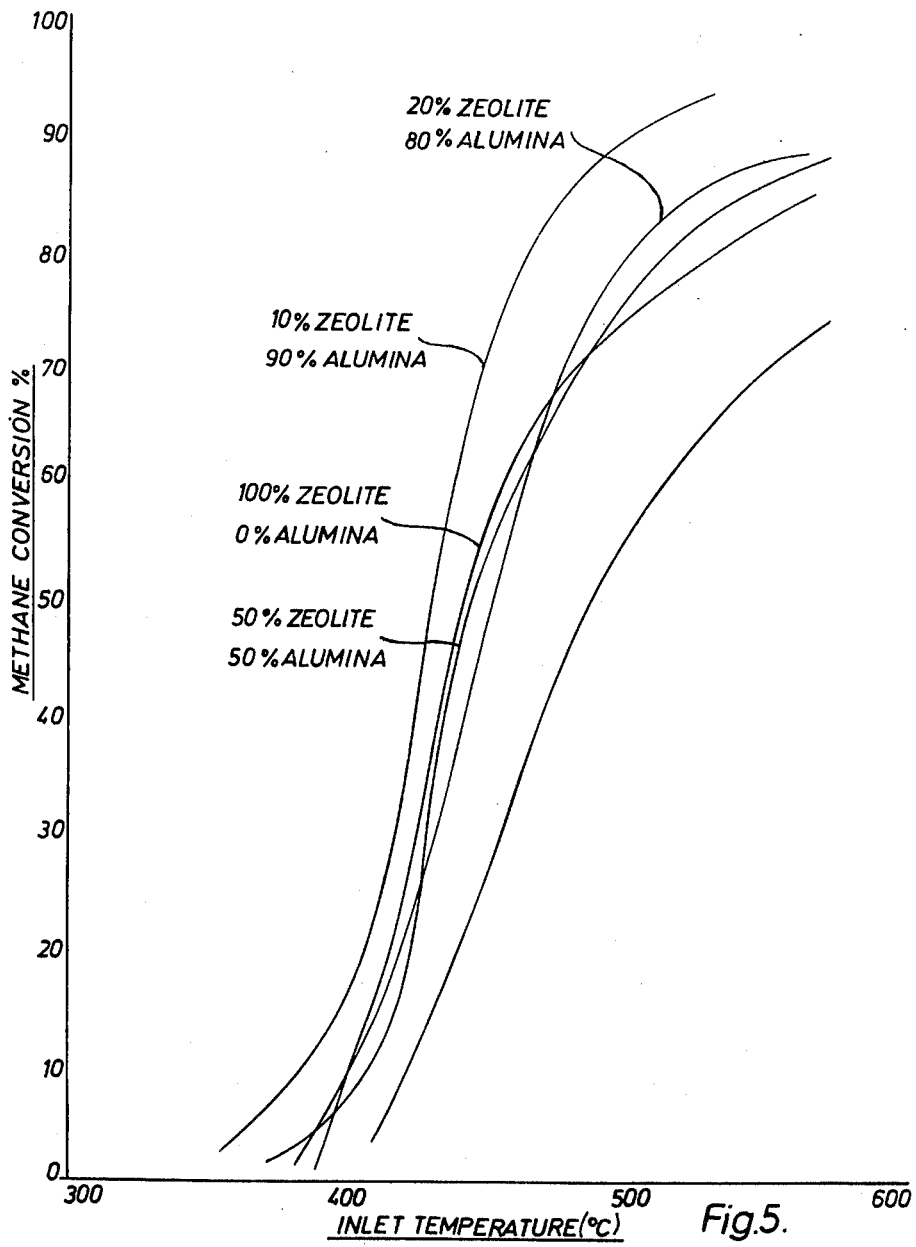

CATALYSIS

This application is a continuation-in-part of Ser. No. 262,272, filed 6/22/72, now U.S. Pat. No. 3,839,225.

This invention relates to processes for catalytically oxidizing organic compounds (for example methane, ethane, propylene and carbon monoxide) catalytically reducing oxides of nitrogen with a reducing fuel and the production of methane by the steam reforming of naphtha and naphtha distillates. In particular the invention relates to a process for the oxidation of carbon monoxide or a hydrocarbon present in an oxygen-containing gas stream to carbon dioxide and water.

Methane, primarily as a result of its relative cheapness and its presence in natural gas is being used increasingly as a reducing fuel and may be oxidised in a number of industrially important processes.

Unburnt hydrocarbons, partially oxidised hydrocarbons, oxides of nitrogen and carbon monoxide contained in the exhaust gases from internal combustion engines in addition to a wide variety of other organic compounds produced by well established processes in the chemical industry, present serious problems of atmospheric contamination. For example, the oxide of nitrogen which is present in diesel exhaust gases is mainly nitric oxide. This is produced during the combustion of diesel fuel by the combination of nitrogen and oxygen at the high temperatures and pressures present in a combustion chamber. The presence of nitric oxide in the exhaust gases is particularly hazardous when the engine is used in a confined space.

Any engine operating parameter that reduces the combustion temperature will reduce the nitric oxide concentration. For example, retarding the engine, increasing the fuel concentration, reducing the compression ratio, reducing the maximum power output of the engine, and recycling the exhaust gases all load to a reduction in nitric oxide levels.

Unfortunately, a number of these modifications which reduce nitric oxide levels also increase the CO and hydrocarbon content of the exhaust gases and therefore cannot be used without an exhaust gas purification unit.

Catalytic combustion is a well established procedure for the elimination of many of the components present in the exhaust from a diesel engine. The catalytic system works by promoting the combustion of the carbon monoxide, hydrocarbons, aldehydes, etc., that are present in the exhaust gases with oxygen. The products of this reaction are carbon dioxide and water, which of course, are odourless and non-toxic. Unlike the petrol engine, there may be up to 20% excess air in the exhaust gases of diesel engines, which affords adequate oxygen for combustion.

As the catalytic combustion reactions are more effective the higher the exhaust temperatures, it is preferable for the catalytic unit to be installed as close to the exhaust manifold as is practical.

Generally catalytic oxidation takes place at a much lower temperature than that required by direct combustion and, because it is a surface reaction, is less influenced by the concentraion of the reactants.

For safety reasons the concentration of combustible fume in plant air streams does not exceed 25% of the lower explosion limit and cannot therefore be ignited. The fume concentrations encountered in air pollution problems may range from 1 to 1000 ppm and for combustion to take place, the fume laden air must be raised to the autogenous ignition temperature which depends upon the chemical composition of the fume. It is rarely below 500° C and may be as high as 1000° C for complete combustion.

The cost of the fuel required to achieve these temperatures is frequently prohibitive and, in some cases, higher than the operating cost of the process generating the fume. Therefore, although combustion is an attractive method of destroying organic pollutants because it is continuous and produces no effluent, a means of reducing the reaction temperature is required to make the process more economic.

Hydrocarbons such as methane and ethane and other organic components emitted in the exhausts of diesel engines under medium or high load conditions require relatively high catalyst temperature before reaction occurs. Thus, if a catalyst could be made which was active for methane and the lower hydrocarbons at substantially lower reaction temperatures it would constitute a substantial advance over the existing processes. Similarly, the use of a supported catalytic metal for air pollution abatement (frequently known as NOX abatement) the most difficult fuel to use is methane as it requires high catalyst temperature before the reaction occurs. Methane is however, one of the cheapest fuels available and if a catalyst could be made which was active for methane at substantially lower reaction temperatures, it would also constitute a substantial advance over the existing processes.

Production of nitric acid by the oxidation of ammonia normally results in a tail or waste gas containing noxious NO and $NO_2$. The presence of oxides of nitrogen in the tail gases results from the incomplete conversion of the nitrogen oxides to nitric acid and, the noxious oxides of nitrogen are usually discharged into the atmosphere. The discharge of these oxides of nitrogen into the atmosphere is undesirable since they are corrosive and present risk of injury to both vegetable and animal life.

The tail gas from nitric acid plants wherein ammonia is oxidised typically contains, by volume, from 0.1 to 0.5 percent of NO, trace to 0.3 percent of $NO_2$, from 2 to 5 percent of $O_2$ and the balance inert constituents, for example, nitrogen and argon. Additionally $N_2O$ may also be present in amount of from a trace to 1 percent by volume and also water vapour in amount up to 5 percent by volume.

For "NOX" abatement, it is desirable to remove all or substantially all of the nitrogen oxides before venting the tail gas to the atmosphere. However, both incomplete and complete removal of the nitrogen oxides are of commercial interest. It is an object of the present invention to enable more efficient purification of tail gases than hitherto has been possible by known processes. In a purification process involving the catalytic reduction of oxides of nitrogen, a reducing fuel (e.g. $H_2$, CO), a normally gaseous hydrocarbon, (namely methane or natural gas, or other hydrocarbons gases or liquids) are injected into the stream of tail gas and reacted with the nitrogen oxides in the stream. When the fuel stoichiometrically exceeds the nitrogen oxides and oxygen, the nitrogen oxides are reduced to exceedingly low concentrations. Because of the large gas flow involved in the manufacture of nitric acid (typically about 1 million standard cubic feet of gas per hour in a plant having a nitric acid production of 240 tons per day) the catalysts are required to have a high level of activity and the reactors are required to be capable of handling large gas flows.

Many nitric acid plants use high pressure processes in the ammonia oxidation step, and it is highly advantageous to recover from the plant tail gas, energy which can be utilised to supply power to the system. In some systems sufficient energy can be recovered for the process to be self-sustaining and even to provide additional power. In such systems it is important the catalyst be highly active, exhibit a minimum resistance to gas flow and catalyse the reaction at low initial reaction or ignition temperatures.

The catalyst itself, should however, still have reasonably high (750°–800° C) temperature stability. Equivalent problems are associated with the use of natural gas (which is mostly methane but includes a certain amount of $H_2$).

Important advantages of low ignition temperature are:

a. better fuel conversion efficiency and lower running costs (that is, in those cases where the organic effluent is being used as a fuel);

b. a higher percentage removal of noxious gases escaping into the atmosphere;

c. smaller heat exchangers and a cheaper reactor system may be used d. it makes possible the use of a single catalyst bed instead of a dual or other more complicated system.

It is another object of this invention to provide a process whereby ignition of organic contaminants may take place at a relatively low temperature, thus enabling them to be more completely removed from an effluent gas escaping into the atmosphere.

Air pollution control by catalytic combustion imposes a number of restrictions on the type of catalyst which may be used. In addition to a requirement that the catalyst should be active at low temperatures, it should be stable under both oxidising and reducing conditions. The catalyst when packed into a reactor should have a very low pressure drop across the bed and it should be resistant to attrition, thermal shock and clogging by dust particles.

Hitherto platinum has been the preferred catalyst for air pollution control. In the conventionally supported form, platinum is more active than base metal catalysts, it is stable up to at least 75% and is resistant to poisoning by most elements except lead and phosphorus.

Supported platinum has been used in pelleted form but pressure drop problems through the catalyst bed and attrition between the individual catalyst pellets (which causes dusting and loss of precious metal) impose sever limitations on the design of the catalyst reactor.

The concentration of organic compounds in the fume is also important. In most cases, the concentration does not signifcantly affect the ignition temperature. A notable exception, however, is methane. The concentration of the fume and its composition does, however, determine the amount of oxygen that will be consumed and the temperature rise that will occur on the catalyst. This may be calculated and used in the design of the abatement plant. Where it is significant, the heat generated may sustain the oxidation or be recycled to maintain the temperature of the process gas.

The temperature of the gas stream containing the fume to a large extent determines the design of the plant required for pollution control. When the temperature is above that required for ignition, the catalyst may be placed directly in the gas stream. Examples of this use are wire-enamelling ovens, some paint-drying ovens, self-cleaning cookers and diesel or internal combustion engine exhaust systems.

In the purification processes, the catalysts are often subjected to temperatures of well over 500° C for considerable lengths of time and a major factor producing deactivation of the catalyst is the inability of the catalytically active refractory oxide support to withstand the corrosive conditions and temperatures obtaining for long periods of time. This is certainly true of the most popular support in use, catalytically active or gamma alumina. Alumina in this form is normally present as a coating on the support, e.g. some kind of refractory ceramic, possibly in honeycomb form. A catalytically active metal is normally deposited on the alumina.

Various mixtures and combinations of intermediate refractory metal oxide coatings and superficial catalytically active metals have been tried, all with varying degrees of success.

According to one aspect of the present invention there is provided a process for the oxidation of carbon monoxide or a hydrocarbon present in an oxygen-containing gas stream to carbon dioxide and water, the process comprising passing the said gas stream at an elevated temperature through a supported catalyst consisting essentially of an inert material, an intermediate coating thereon containing at least one oxide selected from the group consisting of the oxides of scandium, yttrium and the lanthanides and a catalytically active surface coating on said intermediate coating of an alloy selected from the group consisting of (1) platinum/rhodium alloys wherein the rhodium constitutes 1–50 weight % of the total metal content of the alloy and the platinum the balance; and (2) platinum/rhodium/base metal alloys wherein the rhodium constitutes 1–50 weight % of the total metal content of the alloy, the base metal from 0.1 to 25 weight % of said total metal content and the platinum the balance, the base metal being selected from the group consisting of aluminium, magnesium, chromium, molybdenum, tungsten, manganese, iron, cobalt, nickel, titanium, vanadium, thorium, uranium, copper, silver, zinc, cadmium, mercury, indium, thallium, bismuth, tin, lead, antimony, the lanthanides and the actinides.

Preferably, the final surface coating contains 0.01 to 10 weight % of base metal considered as a percentage of the total metal content. The oxide of scandium, yttrium or lanthanide is preferably in the form of a molecular sieve or zeolite and may be present in an amount of at least 5 weight % of the intermediate coating.

In this specification, for the purpose of brevity, scandium, yttrium and lanthanides group of metals are referred to as the Group IIIA metals of the Periodic Table.

Preferably, oxides of the Group IIIA metals are present in the intermediate coating in the form of an ion-exchanged molecular sieve. We prefer to use a zeolite in which the ion-exchangeable sodium has been exchanged for a Group IIIA metal by contact with an aqueous solution containing dissolved therein a salt of the Group IIIA metal ion.

We prefer to use an alumina-based intermediate coating containing up to 50% (more preferably 5–20%) i.e. a hydrated aluminium silicate) which has been converted to the neodymium form. The alumina we prefer to use is that produced by activation of hydrated alumina. Alpha Al(OH)$_3$ or Gibbsite is normally activated (i.e. converted) to chi Al$_2$O$_3$ having a surface area of about 250 m$^2$/g compared with an original of 2 m$^2$/g by:

a. impregnating the inert material ultimate support with a hydrated alumina slurry (also containing the appropriate quantity of exchanged zeolite), b. drying overnight at 80° C and c. firing on to the inert material ultimate support at 450° C for 16 hours.

Catalysts according to the present invention may also be used for the production of methane by the steam reforming naphtha. Significant quantities of methane are produced by the passage of naphtha feedstocks at high temperature (preferably 250°–2,000° C) and pressure (preferably 300 to 1,000 psig) through the above described Pt-Rh-base metal catalysts. Good results are obtained with nickel, cobalt, iron and copper. This process has application where natural gas supplies are not readily available.

By "base metal" we mean one or more metals other than those of the platinum group metals and gold. Base metals which we prefer are aluminium, magnesium, chromium, molybdenum, tungsten, manganese, iron, cobalt, nickel, titanium, vanadium, thorium, uranium, copper, silver, zinc, cadmium, mercury, indium, thallium, bismuth, tin, lead, antimony, the lanthanides and the actinides. Of these we particularly prefer nickel and copper. Other base metals which produce good results are iron, cobalt, silver and the lanthanide series, particularly neodymium. By "lanthanide series of metals" we mean those elements having atomic numbers from 57–71 inclusive and the term "organic compound" includes carbon monoxide. For the purpose of this specification we include silver as a base metal although it is of course often regarded as a noble metal.

By "elevated temperature" we mean a temperature sufficient for catalytic oxidation of a significant quantity of the organic compound of catalytic reduction of a significant quantity of the oxide of nitrogen etc., to occur as a result of contact with the catalysts of the invention. For example, in the case of producing methane by reforming naphtha, the elevated temperature is 300° C. In the oxidation of organic compounds, e.g. benzene, carbon monoxide and propylene, the elevated temperatures are 180° C, 150° C and 200° C respectively.

The first or intermediate coating may contain at least 5–50 weight % and preferably 5–20% by weight of a molecular sieve having exchanged on to it a metal selected from the group consisting of scandium, yttrium and the lanthanides. The first coating, layer or deposit is, thereafter, preferably coated or impregnated with the mixture or alloy of platinum, rhodium and optionally base metal as specified above. Alternatively, the material forming the first coating, layer or deposit may be pre-coated or pre-impregnated with the said mixture or alloy of platinum and rhodium as specified, prior to application thereof to the inert material.

The inert material has a first deposit of a refractory metal oxide which is itself then impregnated or coated with the mixture or alloy of platinum, rhodium and base metal component as specified above. Conveniently, the said mixture or alloy contains from 5 to 45 weight % and preferably 35 weight % rhodium considered relative to the total metal in the mixture or alloy. If a lanthanide metal component is present in the rhodium-platinum alloy as well, it is preferably 5% of the total metal component present and at least 50% by weight of the total base metal component present. The base metal component is conveniently 5–10 weight % of the total metal component present.

A further catalyst for use in the process of this invention, comprises an inert rigid porous refractory honeycomb structure, a first or intermediate coating containing at least one oxide selected from the group constituted by the oxides of scandium, yttrium and the lanthanides and a final surface coating of a mixture or alloy of platinum, rhodium and optionally base metal, the mixture or alloy containing from 1 to 50 weight % rhodium and from 0.01 to 25 weight % base metal considered relative to the total metal content.

Preferably the first coating of refractory metal oxide is mainly alumina but contains at least 5% by weight of a zeolite having exchanged on to it a Group IIIA metal and is further impregnated or coated with the said mixture or alloy of platinum, rhodium and base metals. The Group IIIA metal which we prefer to use is neodymium.

According to another aspect of this invention, a process for the reduction with a reducing fuel of an oxide of nitrogen or the oxidation of an organic compound from a gas also containing oxygen comprises passing the gas mixture at an elevated temperature through a supported catalyst consisting essentially of an inert material, an intermediate coating thereon containing at least one oxide selected from the group consisting of the oxides of scandium, yttrium and the lanthanides and a catalytically active surface coating on said intermediate coating of an alloy selected from the group consisting of (1) platinum/rhodium alloys wherein the rhodium constitutes 1–50 weight % of the total metal content of the alloy and the platinum the balance; and (2) platinum/rhodium/base metal alloys wherein the rhodium constitutes 1–50 weight % of the total metal content of the alloy, the base metal from 0.01 to 25 weight % of said total metal content and the platinum the balance, the base metal being selected from the group consisting of aluminium, magnesium, chromium, molybdenum, tungsten, manganese, iron, cobalt, nickel, titanium, vanadium, thorium, uranium, copper, silver, zinc, cadmium, mercury, indium, thallium, bismuth, tin, lead, antimony, the lanthanides and the actinides. Preferably the quantity of base metal used is 0.01 to 10 weight % of the total metal content.

According to a further aspect of the present invention, a process for the oxidation of an organic compound in a gas containing oxygen comprises passing the gas at an elevated temperature through a supported catalyst consisting essentially of an inert material, an intermediate coating thereon containing at least one oxide selected from the group consisting of the oxides of scandium yttrium and the lanthanides and a catalytically active surface coating on said intermediate coating of an alloy selected from the group consisting of (1) platinum/rhodium alloys wherein the rhodium constitutes 1–50 weight % of the total metal content of the alloy and the platinum the balance; and (2) platinum/rhodium/base metal alloys wherein the rhodium constitutes 1–50 weight % of the total metal content of the alloy, the base metal from 0.01 to 25 weight % of said total metal content and the platinum the balance, the base metal being selected from the group consisting of aluminium, magnesium, chromium, molybdenum, tungsten, manganese, iron, cobalt, nickel, titanium, vanadium, thorium, uranium, copper, silver, zinc, cadmium, mercury, indium, thallium, bismuth, tin, lead, antimony, the lanthanides and the actinides.

The invention also includes a process for the removal of noxious oxides of nitrogen from waste gases containing the same in admixture with oxygen, the process comprising injecting into the waste gas a quantity of gaseous reducing fuel sufficient to provide a slight stoichiometric excess over the total content of nitrogen oxides and oxygen present and passing the resulting gaseous mixture, at a temperature above the ignition temperature of the waste gas and fuel through a supported catalyst, whereby the content of nitrogen oxide is effectively reduced, the said support catalyst consisting essentially of an inert material, an intermediate coating thereon containing at least one oxide selected from the group consisting of the oxides of scandium, yttrium and the lanthanides and a catalytically active surface coating on said intermediate coating of an alloy selected from the group consisting of:

1. platinum/rhodium alloys wherein the rhodium constitutes from 1050 weight % of the total metal content of the alloy and the platinum the balance; and
2. platinum/rhodium/base metal alloys wherein the rhodium constitutes 1-50 weight % of the total metal content of the alloy, the base metal from 0.01 to 25 weight % of said total metal content and the platinum the balance, the base metal being selected from the group consisting of nickel, cobalt, iron, copper, neodymium, indium, tin, zinc, silver, and chromium.

From the foregoing it will be appreciated that the catalyst used in processes of the present invention comprises a support formed from an inert material, a first or intermediate coating containing alumina and an aluminium silicate zeolite having neodymium exchanged on to it and a final surface coating of a mixture or alloy containing 1-50 weight % rhodium, 0.01 to 25 weight % of a nickel and balance platinum.

In preferred forms of this catalyst the neodymium exchanged aluminium silicate constitutes approximately 10% by weight and activated alumina approximately 90% by weight of the first or intermediate coating. The final surface coating of mixture or alloy has the following preferred composition:

|   | Pt | Weight % Rh | Ni |
|---|----|----|----|
| (a) | 87½ | 7½ | 5 |
| (b) | 72½ | 7½ | 20 |
| (c) | 60 | 35 | 5 |
| (d) | 45 | 35 | 20 |

According to another aspect of this invention a process for the removal from a gas of an oxide of nitrogen comprises passing the gas together with a gaseous reducing fuel through a supported catalyst comprising an inert material, a first or intermediate coating containing at least one oxide selected from the group constituted by the oxides of scandium, yttrium and the lanthanides, and a final surface coating of a mixture or alloy of platinum, rhodium and optionally base metal in which the rhodium constitutes from 1-50 weight % and the base metal constitutes from 0.01 to 25 weight % of the total metal content. The invention also includes a catalyst comprising an inert material, a first or intermediate coating containing alumina and an aluminium silicate zeolite having a lanthanide metal exchanged on to it and a final surface coating of an alloy of platinum and rhodium in which rhodium constitutes from 5 to 45 weight %.

Conveniently the gas to be processed is in the form of a stream.

The following characteristics have been found to be suitable in the working of the invention, but are not, of course, obligatory.

The inert structure used in the process of the present invention and on which the refractory metal oxide is deposited, is an inert unitary rigid honeycomb structure or block having a plurality of pores or channels therethrough extending in the direction of gas flow. The structure will usually occupy nearly all of the cross-sectional area of the reaction zone available with a packing between the structure and the reactor walls so as to prevent by-passing of the structure by any part of the gas stream. Alternatively, the inert structure may be of corrugated cellular form.

The inert material used in the present invention, on which the refractory metal oxide is coated may be any refractory compound which is unreactive with the coating and which can be prepared in a form which has a high surface area. It is preferably also unreactive with any of the gaseous constituents present in the operation of the process. Oxides, or mixtures of oxides, of one or more of the following elements may be used as the inert material ulitmate support: magnesium, calcium, strontium, barium, aluminium, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten, and uranium. Compounds such as the carbides, borides and silicides of the transition metals may also be used. Other suitable ceramic materials which may be used are zircon-mullite, mullite, alpha alumina, sillimanite, magnesium silicates, zircon, petalite, spodumene, cordierite and alumino-silicates. Suitable proprietary products are "MATTECEL" (Trade Name) supplied by Matthey Bishop Inc., "TORVEX" (Registered Trade Mark) sold by E.I. du Pont de Nemours & Co., and "THERMACOMB" (Registered Trade Mark) sold by the American Lava Corporation. Another useful product is described in British Patent No. 882,484.

For large cross-sectional areas, say six inches, or more, it is convenient to provide a regularly arranged array of closely fitting blocks of ceramic. Also it may be desirable for more complete purification to provide sequential or serial block positioning. In this latter case, and if desired, the low back pressure may be further reduced between layers of blocks by shallow parallel grooves at an end of a block to enlarge connections between channels. Advantageously, the unitary structure is shaped to fit and, preferably, closely fit, the reaction zone or reactor into which it is to be disposed. Blocks of appropriately shaped honeycomb materials to support the catalyst are placed in the reactor so that the general direction of the cellular gas flow channels is in line with the gas flow through the reactor. Alternatively, the blocks may be disposed so that gas flow through the reactor is radial or transverse to the general or overall gas flow.

The structure support is constructed of a substantially chemically inert, rigid, solid porous refractory material capable of maintaining its shape and strength at high temperatures, for instance up to 1100° C or more. The refractory material should preferably have a bulk density of from 0.45 to 1.05 grams per cubic centimeter, (from 0.5 to 0.9 grams per cubic centimeter is more suitable) and be unglazed. The accessible pore volume not including the volume of gas flow channels is preferably greater than 0.10 cubic centimeter per gram of structure, more preferably between 0.20 and 0.30 cc/g.

The walls of the channels of the unitary support structure of this invention contain macropores in communication with the channels to provide increased accessbile catalyst surface, and an absence of large numbers of small pores for high temperature stability and strength. Whereas the superficial surface area of such structures may be from 0.001 to 0.01 m²g including the channels, the total surface area is typically hundreds of times greater, so that much of the catalytic reaction will take place in the large pores. The structure preferably has a macropore distribution such that over 95% of the pore volume is in pores having a size, i.e. diameter, greater than 2000 Angstrom units, and over 5% of the pore volume preferably is in pores having a size of over 20,000 A. In a preferred embodiment over 50% of the pore volume is in pores of sizes of over 20,000 A.

The superficial surface area of the carrier including the walls of the gas flow channels should be as large as in consistent with an acceptable back pressure in the gas flow system. The superficial surface area will often be from 0.5 to 6, preferably from 1 to 2.5, square meters per liter of support. Thus, the channels through the unitary structure can be of any shape and size consistent with the desired superficial surface and should be large enough to permit free passage of the contaminant containing gas to be purified and to prevent plugging by any solid matter entrained by the gas. In one embodiment, the channels are generally parallel and extend through the support from one side to an opposite side, and preferably such openings are separated from one another by thin wall defining the openings. In another embodiment, a network of channels permeates the body. The channels are unobstructed or substantially unobstructed to the gas flow. For most efficient operation, the channel inlet openings are distributed across essentially the entire face or cross-section of the support subject to initial contact with the gas to be reacted. The preferred supports are of mullite or zircon-mullite having good thermal shock resistance owing to a low coefficient of thermal expansion, although other similar chemically inert refractory crystalline ceramic materials can also be employed. Examples of other refractory materials suitable as a support or carriage are, for instance, alpha-alumina, sillimanite, magnesium silicates, zircon, petalite, spodumene, cordierite, aluminosilicates etc.

Unlike a pellet catalyst bed which must be vertical with downward gas flow, there is no restriction on either the position of a ceramic honeycomb catalyst or the direction of the gas flow through a reactor containing it. Ceramic honeycombs have a high surface-to-volume ratio and therefore when supporting catalytic metals produce catalysts which are more active than pelleted catalysts. Because of their open structure the pressure drop across a ceramic honeycomb catalyst bed is only one-twentieth of that across a pellet bed of similar dimensions. Honeycomb supports also have high thermal shock resistance and structural strength and have the great advantage of being attrition resistant.

The refractory metal oxide layer containing one or more oxides of scandium, yttrium and the lanthanides is deposited on the support (either continuously or discontinuously) and preferably the deposit is in the form of a film of from 0.0004 to 0.0001 inches thick. This oxide layer is itself characterised by a porous structure and which possesses a large internal pore volume and total surface area and is therefore referred to as an "active" (i.e. catalytically active) refractory metal oxide. Under operating conditions this layer shows remarkable stability at high temperature and inertness towards the platinum group and base metal with which they may be in contact. Catalysts of this type have previously been deactivated by reaction of the catalytically active metal, such as the platinum group metal with the intermediate refractory metal oxide coating. We have now found that deactivation takes place at a much slower rate when they have a structure and composition according to the present invention. Catalysts according to this invention therefore, represent a considerable advance over prior art catalysts.

A preferred active refractory metal oxide layer also contains members of the gamma or activated alumina family which can be prepared for instance, by precipitating a hydrous alumina gel and, thereafter, drying and calcining to expel hydrated water and provide the active gamma-alumina. A particularly preferred active refractory metal oxide is obtained by drying and calcining at temperatures of 300° to 800° C a precursor mixture of hydrous alumina phases predominating in crystalline trihydrate, that is, containing in excess of 50% by weight of the total alumina hydrate composition, preferably from 65 to 95% by weight of one or more of the trihydrate forms gibbsite, bayerite and nordstrandite by X-ray diffraction. We prefer to use British Aluminium Co. grade MH 170 alumina hydrate and convert it to activated alumina by drying and firing as described above.

Other suitable active refractory metal oxides which may be used in conjunction with the Group IIIA metal oxides include for example, active or calcined beryllia, magnesia or silica, and combination of metal oxides such as boria-alumina or silica-alumina. The active refractory metal oxide deposit may constitute from 1 to 50 weight percent of the unitary support, preferably from 5 to 30 weight percent.

The intermediate layer may contain one or more of the Group IIIA metal oxides as the simple oxide or in bound form when ion-exchanged on to a molecular sieve such as a zeolite. The Group IIIA metal oxide may constitute any proportion by weight of the total intermediate high surface area refractory metal oxide coating up to and including 100%. Preferably, however, it is present in proportion from about 5–20% by weight, the remainder being constituted by one or more of the above-mentioned e.g. alumina, magnesia, silica, beryllia, boriaalumina, silica-alumina, etc.

If, for example, a neodymium exchanged type 13X molecular sieve zeolite (sold by Union Carbide Corporation) is to be used as constituting 10% by weight of the intermediate coating we would prepare this by suspending 100 grams of the sodium form of the zeolite in 500 c.c. of an approximately 5% by weight solution of neodymium nitrate hexahydrate $Nd(No_3)_3 6H_2O$ also containing approximately 2% by weight of ammonium nitrate. This mixture would be refluxed at 80°–90° C for 18 hours, washed, dried and fired at 500° C for 2 hours.

The whole process would then be repeated and would produce a zeolite in which all the sodium had been exchanged for neodymium.

The layer containing oxides of oxides of the Group IIIA metals may be deposited on the support in several ways. One method involves dipping the support into a solution of the salt(s) of the refractory metal(s) and calcining to decompose the salt(s) to the oxide form. Another and preferred method comprises dipping the support into an aqueous suspension, dispersion or slurry of the refractory oxide itself, drying and calcining. In the latter method, suspensions or dispersions having a solids content of from 10 to 70% by weight can be used to deposit a suitable amount of a refractory metal oxide on the support in a single application. In order to prepare a catalyst having 10% by weight of exchanged zeolite on a zirconmullite structure, from 20 to 40% by weight of solids is used in the suepension. The percentage of the solids present is determined on an ignited weight basis (ignited at 1100° C). Another preferred method involves forming an aqueous dispersion or slurry as just described and subjecting the mixture to a wet grinding or milling operation whereby the Group IIIA metal oxide is reduced to a finely divided form and a thixotropic slip is obtained, having the desired consistency, e.g. a solids content of 10 to 70% by weight. The support is then dipped into the slip, dried and calcined. In general, calcining temperatures of from 150° to 800° C are employed. The calcination is favourably conducted in air, for example, flowing dried air, or may be carried out in contact with other gases such as oxygen, nitrogen, of flue gas or under vacuum conditions. The intermediate layer containing Group IIIA metal oxide is deposited on the surface of the structure including the channel surfaces and superficial macropores in communication with the channel surfaces as thin deposits in a weight ratio of from 1 to 50% and preferably from 5 to 30% relative to the weight of the block.

In an alternative embodiment of the present invention, a second intermediate support may also be used. For example, the Group IIIA metal oxide may be deposited upon particles of alumina, and the so-coated particles may then themselves be deposited upon the inert ultimate support material which may also, for example, be made of alumina. Alternatively, it could also be a honeycomb composed of any one of the ceramic materials detailed above. In this way, it is possible to produce a catalyst which presents a very much larger surface area of catalytically active metal to the reacting gases. It will be appreciated that more than one intermediate support may be utilised, depending upon the relative sizes of each of the particles involved. It is, however, not usually necessary to employ more than two intermediate coatings. For example, the structure of the catalyst could be as follows:

a. an ultimate inert support material in ceramic honeycomb form;

b. particles of a second inert material on said material (a) which is the same or different from the ultimate inert support material coated with c. an intermediate refractory oxide coating containing at least one Group IIIA metal oxide selected from the group consisting of the oxides of scandium, yttrium and the lanthanides possibly bound in zeolitic form in conjunction with active alumina, and d. a catalytically active metal layer on said coating (c) comprising a platinum/rhodium alloy containing up to 25% by weight of a base metal selected from the group consisting of nickel, cobalt, iron, copper, neodymium, indium, tin, zinc, silver and chromium.

Know methods may be used for preparing structure of this type.

For example, to a colloidal dispersion of alumina in water i.e. hydrated aluminium oxide sol there is added a soluble salt of a Group IIIA metal and an alkali such as ammonium hydroxide solution in sufficient quantity to precipitate the soluble metal salt as the oxide on to the colloidal aluminium particles. The precipitate may then be filtered and used to prepare a slip which can then itself be used for coating a ceramic honeycomb. The coated inert material particles are preferably between 0.01 and 25 microns in diameter. Further, the inert material may be completely coated with precipitated oxide of the Group IIIA metal.

An alternative method is co-precipitation. Solutions of soluble salts of the inert material oxide precursor (e.g. aluminium nitrate if the inert material is to be alumina) and of a Group IIIA metal are treated with sufficient alkali, preferably ammonium hydroxide solution, to precipitate both metal oxides together. However, this method is not so satisfactory and it may be modified by using a slurry of the metal salt.

The structure support may be wetted prior to applying the refractory metal oxide. In one embodiment, a zircon-mullite structure is immersed in an aqueous suspension containing the desired weight concentration of hydrated refractory oxide. The structure, because of its porosity, has been found to absorb the suspensions readily. The catalyst structure is then dried and calcined at a temperature of from 400° to 800° C and preferably of from 450° to 550° C. A ⅛ cubic foot zirconmullite block absorbs roughly from 0.25 to 1 liter of the suspension.

The supported catalyst made in accordance with the method of this invention has a refractory oxide deposited on the inert ceramic structure and a catalytically active metal impregnated on the refractory oxide.

Impregnation with the mixture or alloy of platinum, rhodium and base metal may be accomplished by known methods of deposition of catalytically active metals on supports. For example, if a ceramic honeycomb structure is used with an intermediate high surface area coating deposited thereon, the support may be immersed in a solution of water soluble inorganic salt or salts of the platinum, rhodium and base metal such as (for example) chloro-platinic acid, rhodium trichloride and nickel-chloride, agitating the mixture to ensure uniform distribution, and precipitating the metals by chemical or thermal reduction or by precipitating them in a chemically combined state on the support structure. The metal is activated by conventional techniques. After impregnation with platinum, rhodium and base metal, the catalyst may be advantageously contacted with hydrogen sulphide to fix the platinum-rhodium base metal alloy or mixture in the catalytically active film of oxide as a sulphide. This also gives a more active and suitable catalyst with good dispersion of the platinum-rhodium base metal in a form preventing migration of the metal during drying and calcination. Alternatively, an aquoeus solution of platinum, rhodium and base metal. compounds may be reacted with hydrogen sulphide to form a sol, and this sol is applied to the film of intermediate refractory oxide. Following these treatments the completed catalyst can be calcined within the range of 150° to 800° C and under conditions as previously disclosed.

It is desirable that the final catalyst has the intermediate support in the activated or calcined state. It is also known that a ceramic catalyst carrier which has been stabilised by heating to at least 0.4 times its melting point in degrees Kelvin is very much more durable under operating conditions without any sacrifice in the activity of the catalyst. Activation of the intermediate metal oxide film may be carried out prior to depositing it upon the ultimate support or subsequent thereto and even after the platinum, rhodium and, if present, base metal impregnation step. Usually, such material is calcined or partially calcined before deposition on the ultimate support and also after such deposition, but before deposition of the catalytic metal component. The catalyst containing the platinum-rhodium-base metal mixture or alloy may be reduced by contact with molecular hydrogen at elevated temperature before, during, or after, calcination.

The amount of platinum, rhodium and, if present, base metal necessary will vary depending upon the particular ratio selected. In all instances, however, the amount of platinum, rhodium and base metal compounds added will be that sufficient to provide a small but catalytically effective amount of the metal in the final catalyst to catalyse the removal of organic contaminants from the gas. In general, the total amount of catalytically active metal component may be in the range of, by weight, from 0.05 to 10% preferably 0.5 to 2% (based on total supported catalyst structure).

Suitable concentrations which we have found to be satisfactory are 0.9% w/w and 1.8% w/w.

The catalysts according to the present invention when used for pollution control may be expected to have an active life of at least 2½ years. While palladium on ceramic honeycomb catalysts exhibit acceptable ignition temperatures, they have been found to be unstable at the temperatures of operation and have been known to fail in one month. This is particularly so when the catalytically active refractory metal oxide intermediate support is alumina. Our results indicate that 5-40% rhodium, 95-60% (platinum plus base metal, if present) deposited upon an intermediate support of an oxide of aluminium containing a neodymium exchanged zeolite and an ultimate ceramic honeycomb support, produces a catalyst which combines a usefully low ignition temperature with exceptionally good stability under oxidising conditions at elevated temperatures.

In two preferred embodiments of catalysts, of the catalytically active metal components present (i.e. platinum, rhodium and base metal), rhodium constitutes 7.5% and 35% by weight of the total. It is also preferred that the combination of chemical and/or thermal methods of impregnation and reduction are such that an alloy of the metal components is formed on the surface of the support. However, not all base metal constituents will necessarily be reduced to metallic form. Compound of chromium and tungsten, for example, are not likely to be fully reduced.

We have obtained good results in the oxidation of methane and for the production of methane by the catalytic reforming of naphtha with the following alloy compositions deposited upon intermediate layers of alumina containing 10% by weight of an aluminium silicate zeolite having neodymium exchanged on to it and an ultimate ceramic honeycomb support:

| Platinum | Weight Percent Rhodium | Base Metal |
|---|---|---|
| 90 | 6 | Nickel 4 |
| 87.5 | 7.5 | Nickel 5 |
| 91.5–89.5 | 7.5 | Nickel 1 – 3 |
| 64–62 | 35 | Nickel 1 – 3 |
| 91.5–90 | 7.5 | Cobalt 1 – 2.5 |
| 87.5 | 7.5 | Iron 5 |
| 91.5–89.5 | 7.5 | Copper 1 – 3 |
| 60 | 35 | Copper 5 |
| 64–62.5 | 35 | Co 1 – 2.5 |
| 64 | 35 | Cu 1 |
| 60 | 35 | Nd 5 |
| 60 | 35 | Pb 5 |
| 60 | 30 | Nd 5, Ni 5 |
| 60 | 35 | Ni 5 |

Satisfactory results are also obtained by using In, Sn, Zn, Ag or Cr as base metal.

The present invention also includes gases which have been processed by a method or catalyst according to the invention.

The beneficial effects of the catalyst in accordance with the invention of reducing the temperature at which reaction takes place for an aged catalyst will be seen from the following tests and graphical results. Each test was carried out using the same test rig in which a catalyst bed of depth 2 inches was disposed in a pipe having an internal diameter of 2 inches. Moreover, in each test the pressure of gas under test was the same, namely 75 p.s.i.g.

TESTS A — FIG. 1

In these tests the gas passed through the catalyst was an artifical automobile exhaust having a compositon of:
3% $O_2$;
500 ppm propylene;
4% CO;
2.5% $H_2O$ and balance $N_2$.

A 7½% Rh/Pt catalyst was used having an intermediate layer containing zeolite, which is a molecular sieve type 13X sieve (Union Carbide) exchanged with neodymium. Test runs were carried out for the following four catalysts:

| | |
|---|---|
| 10% zeolite | 90% alumina |
| 20% zeolite | 80% alumina |
| 30% zeolite | 70% alumina |
| 50% zeolite | 50% alumina |

Results obtained from oxidising tests on the above four catalysts are shown in FIG. 1 which, for comparative purposes, shows the results obtained for a catalyst containing no zeolite.

A graph showing the percentage conversion of propylene using a 100% alumina catalyst (B) before ageing represents the minimum light-off temperature, that is the temperature at which conversion of the exhaust gas commences.

In each of the tests carried out using the four particular catalysts mentioned above, ageing was effected at 1000° C for 16 hours in air. In FIG. 1 the dotted line indicate the percentage conversion against temperature of carbon monoxide contained in the gas whereas the full lines represent the conversion of propylene contained in the gas.

As mentioned previously in the specification, the main object of the invention is to reduce the temperature at which conversion of the gas commences and it will be seen from the four graphs in FIG. 1 that the best catalyst for this purpose is that containing 10% zeolite, and 100% conversion of the gas occurs at a temperature in the region of 270° C whereas the corresponding temperature for the catalyst used for catalyst A is 315° C. For a conversion of 75% the temperature at which light-off takes place is 205° C whereas the temperature at which light-off occurs for catalyst A is 280° C.

Figure 2:
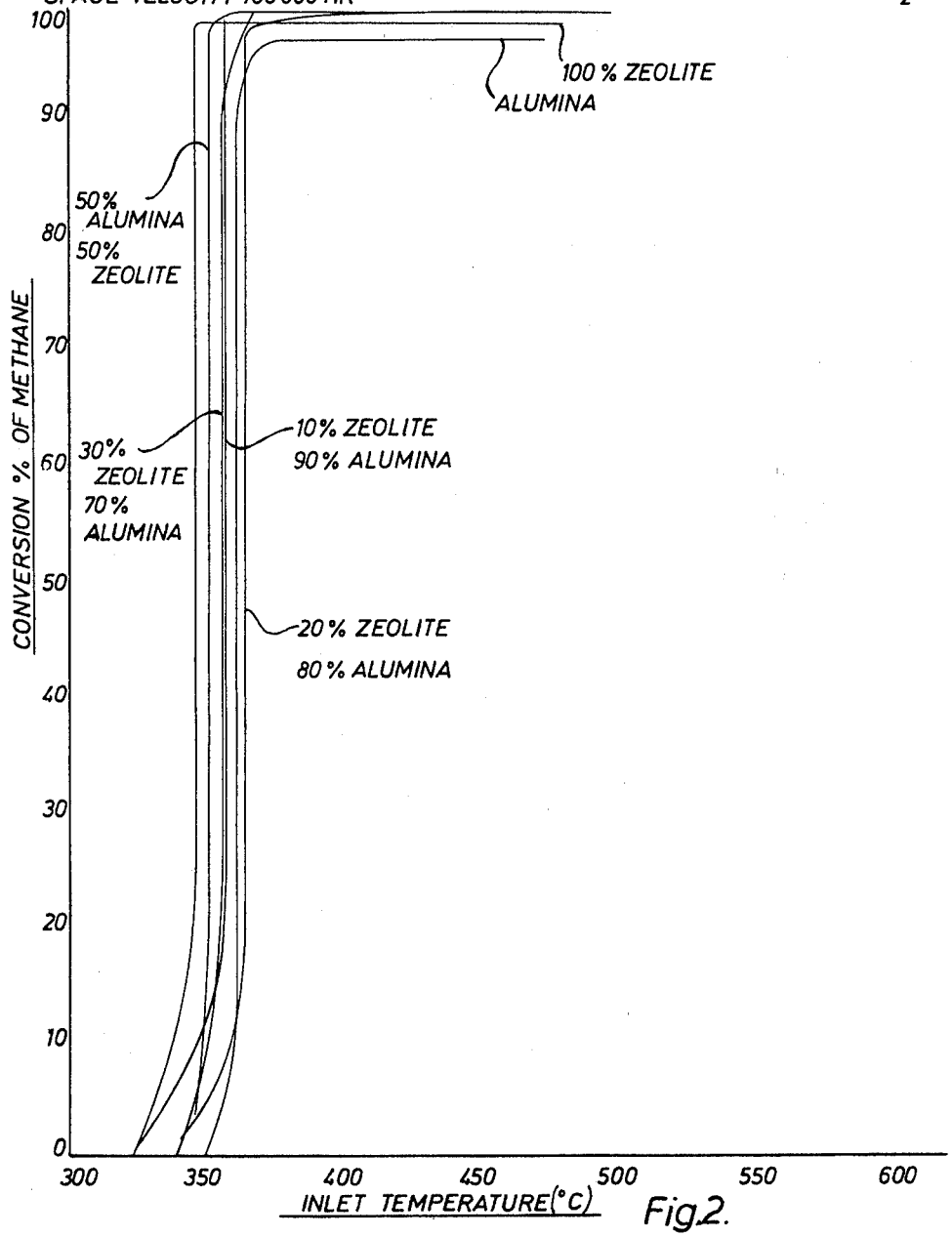
Figure 3:
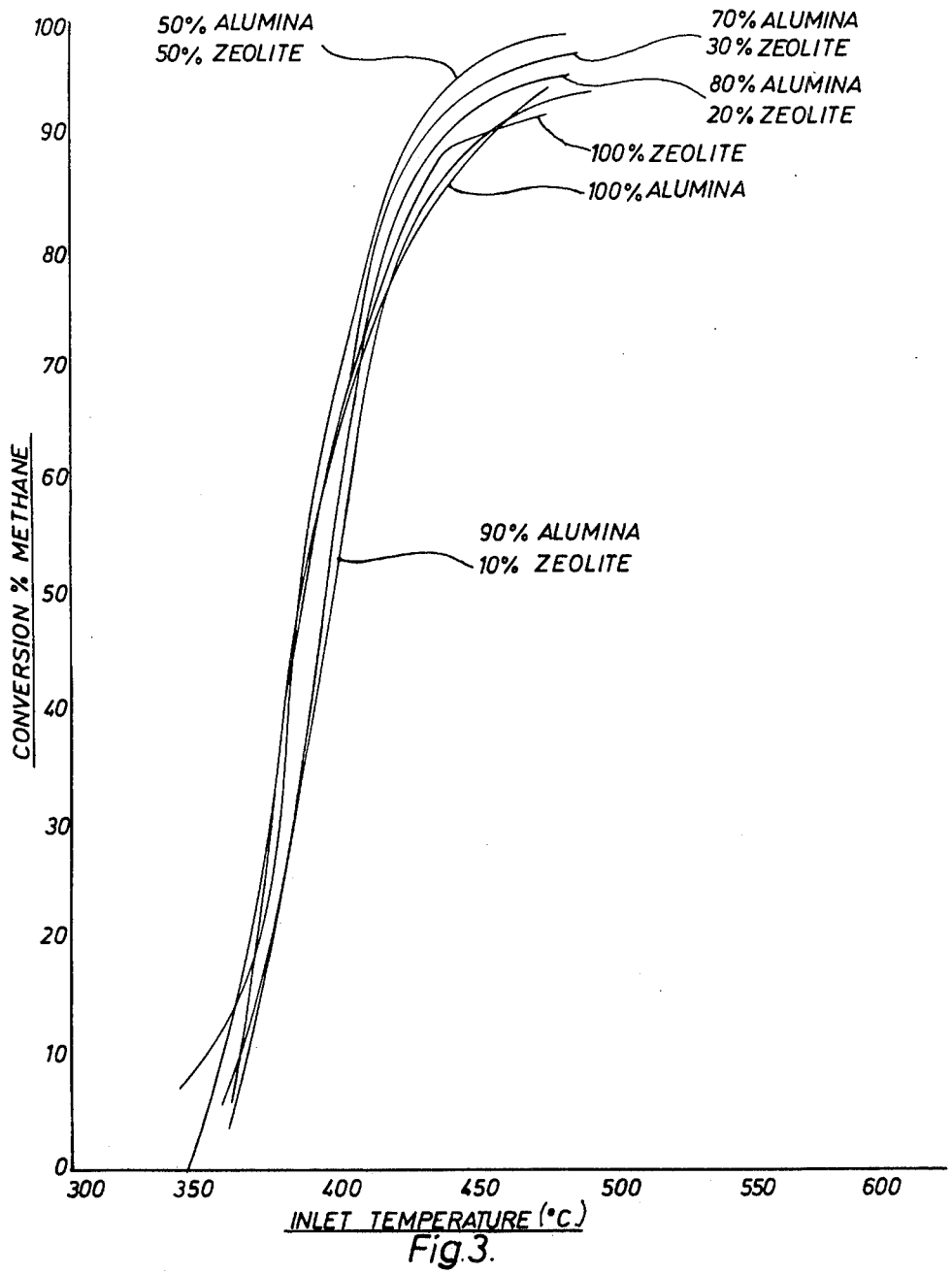

Our tests have shown using a catalyst prior to ageing and containing 35% Rh/Pt under both reducing conditions (FIG. 2) and oxidising conditions (FIG. 3) that, although reduced temperatures are obtained with these catalysts containing zeolite, nevertheless, the reduction in temperature is not usually greater than, say, 20° C. On the other hand, after ageing 35% Rh/Pt catalysts at 800° C for 72 hours it well can be seen from FIG. 4 (compared with FIG. 2) and from FIG. 5 (compared with FIG. 3) that significant reductions in the temperature at which light-off or conversion occurs is obtained.

What is claimed is:

1. A process for the oxidation of carbon monoxide or a hydrocarbon present in a gas stream together with uncombined oxygen, to carbon dioxide and water, the process comprising passing the said gas stream at an elevated temperature through a supported catalyst consisting essentially of an inert material, an intermediate coating thereon containing at least one oxide selected from the group consisting of the oxides of scandium, yttrium and the lanthanides and a catalytically active surface coating on said intermediate coating of an alloy selected from the group consisting of platinum/rhodium/base metal alloys wherein the rhodium constitutes 1–50 weight % of the total metal content of the alloy, the base metal from 0.01 to 25 weight % of said total metal content and the platinum the balance, the base metal being selected from the group consisting of aluminium, magnesium, chromium, molybdenum, tungsten, manganese, iron, cobalt, nickel, titanium, vanadium, thorium, uranium, copper, silver, zinc, cadmium, mercury, indium, thallium, bismuth, tin, lead, antimony and neodymium.

2. A process according to claim 1 wherein the base metal is selected from the group consisting of nickel, cobalt, iron, copper, neodymium, indium, tin, zinc, silver and chromium.

3. A process according to claim 1 in which the inert material is a unitary porous refractory compound.

4. A process according to claim 3 in which the refractory compound is selected from the group consisting of oxides of Mg, Ca, Sr, Ba, Al, Sc, Y, the lanthanides, the actinides, Ti, Ga, In, Rl, Si, Zr, Hg, Ge, Sn, Pb, V, Nb, Ta, Cr, Mo, W, U, transition metal cabides, borides and silicides.

5. A process according to claim 3 in which the refractory compound is in the form of a ceramic material.

6. A process according to claim 5 in which the catalyst is in the form of a corrugated cellular structure.

7. A process according to claim 6 in which the corrugated cellular structure is a honeycomb.

8. A process according to claim 5 in which the ceramic material is selected from the group consisting of zircon-mullite, mullite, alpha alumina, sillimanite, magnesium silicates, zircon, petalite, spodumene, cordierite and alumino silicates.

9. A process according to claim 6 in which the inert material has applied thereto as a first coating a layer or deposit of a refractory oxide which is unreactive with the said material.

10. A process according to claim 9 in which the refractory oxide is in the form of a film 0.0004 to 0.001 inches thick.

11. A process according to claim 9 in which the refractory oxide has a high surface area.

12. A process according to claim 9 in which the refractory oxide has a large internal pore volume.

13. A process according to claim 12 in which the refractory oxide is a mixture of at least one oxide selected from the group consisting of oxides of scandium, yttrium and the lanthanides and at least one of the oxides selected from the group consisting of the oxides of Be, Mg, B, Al, Si, Ti, Zr, Hf and Th.

14. A process according to claim 13 wherein the alloy contains 5 to 45 weight % of rhodium relative to the total metal content.

15. A process according to claim 14 wherein the alloy contains 35 weight % rhodium.

16. A process according to claim 1 wherein the base metal is present in an amount of 0.01 to 10 weight % of the total metal content.

17. A process according to claim 1 in which the supported catalyst comprises:
  a. an ultimate inert support material in ceramic honeycomb form;
  b. particles of second inert material on said material (a) which is the same or different from the ultimate inert support material coated with;
  c. an intermediate refractory oxide coating containing at least one Group IIIA metal oxide selected from the group consisting of oxides of scandium, yttrium and the lanthanides; and
  d. a catalytically active metal layer on said coating (c) consisting essentially of a platinumrhodium alloy containing up to 25% by weight of a base metal selected from the group consisting of nickel, cobalt, iron, copper, neodymium, indium, tin, zinc, sliver and chromium.

18. A process according to claim 17 wherein the amount of oxide of scandium, yttrium or lanthanide in the intermediate coating is at least 5 weight % of that coating and the balance is mainly alumina.

19. A process according to claim 18 wherein the amount of said oxide present in the intermediate coating is 10 weight % of that coating.

20. A process according to claim 13 in which from 5 – 50 % by weight of the refractory metal oxide coating consists essentially of a molecular sieve zeolite having its sodium content ion-exchanged by a metal selected from the group consisting of scandium, yttrium and the lanthanides.

21. A process according to claim 20 in which the sodium content of the xeolite is ion-exchanged by neodymium.

22. A process according to claim 21 in which the ion-exchanged zeiolite constitutes about 10% by weight of the catalytically active refractory metal oxide.

23. A process fo the oxidation of carbon monoxide or a hydrocarbon present in a gas stream together with uncombined oxygen to carbon dioxide and water, the process comprising passing the said gas stream at an elevated temperature through a supported catalyst consisting essentially of (1) an inert material which is a unitary porous refractory compound selected from the group consisting of oxides of Mg, Ca, Sr, Ba, Al, Sc, Y, the lanthanides, the actinides, Ti, Ga, In, Rl, Si, Zr, Hg, Ge, Sn, Pb, V, Nb, Ta, Cr, Mo, W, U, transistion metal carbides, borides and silicides; (2) an intermediate coating thereon which is a high surface area refractory oxide having a large internal pore volume, said refractory oxide being a mixture of 5-20% by weight of at least one oxide selected from the group consisting of the oxides of scandium, yttrium and the lanthanides with the balance essentially at least one oxide selected from the group consisting of the oxides of Be, Mg, B, Al, Si, Ti, Zr, Hf and Th; and (3) a catalytically active surface coating on said intermediate coating of an alloy selected from the group consisting of platinum/rhodium/base metal alloys wherein the rhodium constitutes 1-50 weight % of the total metal content of the alloy, the base metal from 0.01 to to 25 weight % of said total metal content and the platinum the balance, the base metal being selected from the group consisting of aluminium, magnesium, chromium, molybdenum, tungsten, manganese, iron, cobalt, nickel, titanium, vanadium, theorium, uranium, copper, silver, zinc, cadmium, mercury, indium, thallium, bismuth, tin, lead, antimony and neodymium.

* * * * *